United States Patent
Yamamoto et al.

(10) Patent No.: US 10,308,511 B2
(45) Date of Patent: Jun. 4, 2019

(54) PROCESS FOR MANUFACTURING GRAPHITE POWDER FOR LITHIUM SECONDARY BATTERY NEGATIVE ELECTRODE MATERIAL

(71) Applicants: Kazuhiro Yamamoto, Tokyo (JP); Mayuri Komoriya, Tokyo (JP); Motohiro Yamaki, Tokyo (JP); Tomohito Fukugawa, Tokyo (JP); Akihiro Kuroyanagi, Tokyo (JP)

(72) Inventors: Kazuhiro Yamamoto, Tokyo (JP); Mayuri Komoriya, Tokyo (JP); Motohiro Yamaki, Tokyo (JP); Tomohito Fukugawa, Tokyo (JP); Akihiro Kuroyanagi, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 437 days.

(21) Appl. No.: 14/438,097

(22) PCT Filed: Jul. 23, 2013

(86) PCT No.: PCT/JP2013/069898
§ 371 (c)(1),
(2) Date: Apr. 23, 2015

(87) PCT Pub. No.: WO2014/064980
PCT Pub. Date: May 1, 2014

(65) Prior Publication Data
US 2015/0251911 A1    Sep. 10, 2015

(30) Foreign Application Priority Data
Oct. 24, 2012 (JP) .................................. 2012-235161
Jun. 27, 2013 (JP) .................................. 2013-134820

(51) Int. Cl.
*C01B 35/00* (2006.01)
*C01B 31/04* (2006.01)
(Continued)

(52) U.S. Cl.
CPC .............. *C01B 31/04* (2013.01); *C01B 32/05* (2017.08); *C01B 32/20* (2017.08); *C04B 35/522* (2013.01);
(Continued)

(58) Field of Classification Search
CPC ....................................................... C01B 31/04
See application file for complete search history.

(56) References Cited

U.S. PATENT DOCUMENTS

| | | | | |
|---|---|---|---|---|
| 4,135,983 A | * | 1/1979 | Kiritani | .................. C10B 55/02 201/21 |
| 4,997,542 A | * | 3/1991 | Couderc | .................. C10C 1/19 208/22 |

(Continued)

FOREIGN PATENT DOCUMENTS

| | | |
|---|---|---|
| CN | 1851963 A | 10/2006 |
| GB | 2 384 785 A | 8/2003 |

(Continued)

OTHER PUBLICATIONS

K.J. Morris, , "Cold Isostatic Pressing" Chapter in Concise Encyclopedia of Advanced Ceramic Materials, 1991, pp. 84-88 (Year: 1991).*

(Continued)

*Primary Examiner* — Robert A Vetere
(74) *Attorney, Agent, or Firm* — Westerman, Hattori, Daniels & Adrian, LLP

(57) ABSTRACT

A method for easily producing a graphite powder for use as a lithium secondary battery negative electrode material with small specific surface area while reducing energy consump- (Continued)

tion, and achieving high graphitization efficiency, includes melt-mixing a coke powder and a carbon precursor binder so that an amount of fixed carbon included in the carbon precursor binder is 5 to 15 parts by mass based on 100 parts by mass of the coke powder, to prepare a mixture, and pressing the mixture to prepare a compact, the coke powder being obtained by heating a green coke powder at 600 to 1450° C. in a non-oxidizing atmosphere, the green coke powder having a cumulative particle size at 50% in a volumetric cumulative particle size distribution of 5 to 50 μm; heating the compact in a non-oxidizing atmosphere to effect carbonization and graphitization to obtain a graphitized compact; and grinding the graphitized compact.

4 Claims, 1 Drawing Sheet

(51) Int. Cl.
  *H01M 4/587* (2010.01)
  *C04B 35/52* (2006.01)
  *C04B 35/532* (2006.01)
  *H01M 10/0525* (2010.01)
  *C01B 32/05* (2017.01)
  *C01B 32/20* (2017.01)
  *H01M 10/052* (2010.01)
  *H01M 4/02* (2006.01)

(52) U.S. Cl.
  CPC ........... *C04B 35/532* (2013.01); *H01M 4/587* (2013.01); *H01M 10/0525* (2013.01); *C01P 2004/51* (2013.01); *C01P 2006/12* (2013.01); *C01P 2006/40* (2013.01); *C04B 2235/422* (2013.01); *C04B 2235/424* (2013.01); *C04B 2235/5409* (2013.01); *C04B 2235/5436* (2013.01); *C04B 2235/5481* (2013.01); *H01M 10/052* (2013.01); *H01M 2004/021* (2013.01); *H01M 2004/027* (2013.01)

(56) References Cited

U.S. PATENT DOCUMENTS

| | | | | |
|---|---|---|---|---|
| 5,413,738 A | * | 5/1995 | Lewis | C04B 35/532 204/294 |
| 2002/0197534 A1 | * | 12/2002 | Fukuda | H01M 4/366 429/231.4 |
| 2006/0172201 A1 | * | 8/2006 | Yasukawa | H01M 4/133 429/329 |
| 2008/0003167 A1 | * | 1/2008 | Miller | C04B 35/522 423/445 R |
| 2008/0063590 A1 | * | 3/2008 | Miller | C04B 35/522 423/448 |
| 2009/0130561 A1 | * | 5/2009 | Matsumoto | C04B 35/522 429/231.8 |
| 2009/0214954 A1 | | 8/2009 | Onishi et al. | |
| 2009/0280413 A1 | | 11/2009 | Ohta et al. | |

FOREIGN PATENT DOCUMENTS

| | | |
|---|---|---|
| JP | 09-231974 A | 9/1997 |
| JP | 2001-023638 A | 1/2001 |
| JP | 2003-168435 A | 6/2003 |
| JP | 2003-297357 A | 10/2003 |
| JP | 2006-294476 A | 10/2006 |
| JP | 2008-059903 A | 3/2008 |
| WO | 2006/025377 A1 | 3/2006 |

OTHER PUBLICATIONS

Office Action dated Jul. 19, 2016, issued in counterpart Taiwanese Patent Application No. 10520879420, with English translation. (9 pages).

International Search Report dated Oct. 8, 2013, issued in corresponding application No. PCT/JP2013/069898.

Office Action dated Jul. 27, 2016, issued in counterpart Chinese Patent Application No. 201380055968.8, with English translation. (12 pages).

Extended (Supplementary) European Search Report dated May 27, 2016, issued in counterpart European Patent Application No. 13 84 9757. (8 pages).

* cited by examiner

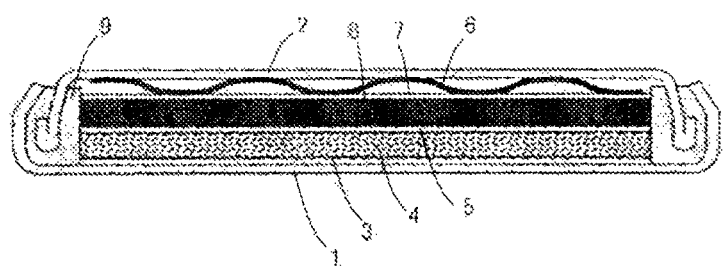

ic material.

PROCESS FOR MANUFACTURING GRAPHITE POWDER FOR LITHIUM SECONDARY BATTERY NEGATIVE ELECTRODE MATERIAL

TECHNICAL FIELD

The present invention relates to a method for producing a graphite powder for use as a lithium secondary battery negative electrode material.

BACKGROUND ART

A lithium secondary battery has a reduced weight and high energy density, and has been expected to be used as a drive power supply for hybrid cars, electric vehicles, and the like in addition to a power supply for portable small electronic devices. Lithium metal was initially used as the negative electrode material for the lithium secondary battery. However, since lithium ions deposit and grow on the negative electrode in the form of dendrites during charge, and decrease the capacity upon falling, or cause a short circuit, a graphite material that does not form such dendrites has been proposed.

A graphite material exhibits a high charge-discharge efficiency due to an excellent lithium ion dope-undope capability (extraction-insertion capability). Moreover, since the potential of the graphite material during charge and discharge is almost equal to that of lithium metal, it is possible to obtain a high-voltage battery, for example.

A known method for producing a graphite powder (graphite material) for use as a lithium secondary battery negative electrode material includes mixing 60 parts by mass of synthetic pitch tar (binder) with 100 parts by mass of green pitch coke, forming the mixture in the shape of a block at a cold isostatic pressure of 900 kgf/cm$^2$, heating the resulting block at 1000° C. and 2800° C. to effect graphitization, and grinding and classifying the resulting graphitized block (see Example 3 of Patent Document 1 (JP-A-2008-059903)).

RELATED-ART DOCUMENT

Patent Document

Patent Document 1: JP-A-2008-059903

SUMMARY OF THE INVENTION

Technical Problem

Patent Document 1 states that the method disclosed in Patent Document 1 can impregnate the green pitch coke with the binder while covering the surface of the green pitch coke with the binder, and suppress generation of gas during charge and discharge, by mixing a large amount of the binder with the green pitch coke (carbonaceous filler), and forming the mixture in the shape of a block at a high pressure.

The inventors of the invention conducted studies, and found that the method disclosed in Patent Document 1 can produce a graphite powder that can suppress generation of gas. However, the inventors found that the strength of the resulting block-like formed body (compact) increases since a large amount of the binder is mixed with the green pitch coke (carbonaceous filler), and the mixture is formed at a high pressure, and a large amount of energy is required when grinding the graphitized formed body (compact). Since the specific surface area of the resulting graphite powder increases, an increase in self-discharge and an increase in irreversible capacity occur, and the power generation capacity decreases when the resulting graphite powder is used as a lithium secondary battery negative electrode material.

In view of the above situation, an object of the invention is to provide a method that can easily produce a graphite powder for use as a lithium secondary battery negative electrode material that has a small specific surface area while reducing the energy consumption, and achieving a high graphitization efficiency.

Solution to Problem

The inventors conducted extensive studies in order to achieve the above object. As a result, the inventors found that the above problem can be solved by producing a graphite powder for use as a lithium secondary battery negative electrode material by melt-mixing a coke powder and a carbon precursor binder so that the amount of fixed carbon included in the carbon precursor binder is 5 to 15 parts by mass based on 100 parts by mass of the coke powder, to prepare a mixture, and pressing the mixture to prepare a compact, the coke powder being obtained by heating a green coke powder at 600 to 1450° C. in a non-oxidizing atmosphere, the green coke powder having a cumulative particle size at 50% in a volumetric cumulative particle size distribution of 5 to 50 μm; heating the compact in a non-oxidizing atmosphere to effect carbonization and graphitization to obtain a graphitized compact; and grinding the graphitized compact. This finding has led to the completion of the invention.

Specifically, one aspect of the invention provides the following method for producing a graphite powder for use as a lithium secondary battery negative electrode material.

(1) A method for producing a graphite powder for use as a lithium secondary battery negative electrode material, the method including:

melt-mixing a coke powder and a carbon precursor binder so that the amount of fixed carbon included in the carbon precursor binder is 5 to 15 parts by mass based on 100 parts by mass of the coke powder, to prepare a mixture, and pressing the mixture to prepare a compact, the coke powder being obtained by heating a green coke powder at 600 to 1450° C. in a non-oxidizing atmosphere, the green coke powder having a cumulative particle size at 50% in a volumetric cumulative particle size distribution of 5 to 50 μm;

heating the compact in a non-oxidizing atmosphere to effect carbonization and graphitization to obtain a graphitized compact; and grinding the graphitized compact.

(2) The method for producing a graphite powder for use as a lithium secondary battery negative electrode material according to (1), wherein the mixture is pressed at a pressure of 1 to 1000 kgf/cm$^2$.

(3) The method for producing a graphite powder for use as a lithium secondary battery negative electrode material according to (1), wherein the carbon precursor binder is one or more materials selected from coal tar pitch, petroleum pitch, ethylene heavy-end, anthracene oil, creosote oil, and FCC decant oil.

(4) The method for producing a graphite powder for use as a lithium secondary battery negative electrode material according to (2), wherein the carbon precursor binder is one or more materials selected from coal tar pitch, petroleum pitch, ethylene heavy-end, anthracene oil, creosote oil, and FCC decant oil.

(5) The method for producing a graphite powder for use as a lithium secondary battery negative electrode material according to any one of (1) to (4), the method producing a graphite powder for use as a lithium secondary battery negative electrode material that has a sphericity of 1.0 to 2.0, a cumulative particle size at 50% in a volumetric cumulative particle size distribution of 5 to 50 μm, a ratio "cumulative particle size at 90% in volumetric cumulative particle size distribution/cumulative particle size at 10% in volumetric cumulative particle size distribution" of 2 to 16, and a specific surface area by nitrogen adsorption of 1.0 to 4.0 $m^2/g$.

Advantageous Effects of the Invention

One aspect of the invention thus provides a method that can easily produce a graphite powder for use as a lithium secondary battery negative electrode material that has a small specific surface area while reducing the energy consumption, and achieving a high graphitization efficiency.

BRIEF DESCRIPTION OF DRAWINGS

FIG. 1 is a vertical cross-sectional view illustrating the structure of the button-type lithium secondary battery that utilizes the graphite powder obtained in each example.

DESCRIPTION OF EMBODIMENTS

A method for producing a graphite powder for use as a lithium secondary battery negative electrode material (hereinafter may be referred to as "production method") according to one embodiment of the invention includes: melt-mixing a coke powder and a carbon precursor binder so that the amount of fixed carbon included in the carbon precursor binder is 5 to 15 parts by mass based on 100 parts by mass of the coke powder, to prepare a mixture, and pressing the mixture to prepare a compact, the coke powder being obtained by heating a green coke powder at 600 to 1450° C. in a non-oxidizing atmosphere, the green coke powder having a cumulative particle size at 50% in a volumetric cumulative particle size distribution of 5 to 50 μm; heating the compact in a non-oxidizing atmosphere to effect carbonization and graphitization to obtain a graphitized compact; and grinding the graphitized compact.

The term "green coke" that is used to produce the green coke powder used in connection with the production method according to one embodiment of the invention refers to coke that is obtained by pyrolyzing heavy oil or pitch using a coke oven (e.g., delayed coker, fluid coker, flexicoker, or chamber coke oven), and has not been subjected to calcining that removes a volatile component.

Specific examples of the green coke include green coke that is obtained by subjecting at least raw material selected from petroleum-derived heavy oil, coal-derived heavy oil, FCC decant oil (FCCDO), ethylene heavy-end (EHE), and the like to pyrolysis and polycondensation at a maximum temperature of 400 to 550° C. using coking equipment such as a delayed coker.

When implementing the production method according to one embodiment of the invention, it is preferable to use mosaic coke having a small amount of anisotropic structure as the green coke used to produce the green coke powder.

The green coke powder used in connection with the production method according to one embodiment of the invention has a cumulative particle size (D50) at 50% in the volumetric cumulative particle size distribution of 5 to 50 μm, preferably 5 to 40 μm, more preferably 5 to 30 μm, still more preferably 5 to 20 μm, still more preferably 5 to 17.5 μm, and yet more preferably 5 to 15 μm.

When the green coke powder has a cumulative particle size at 50% in the volumetric cumulative particle size distribution of 5 μm or more, it is possible to reduce the specific surface area of the resulting graphite powder for use as a lithium secondary battery negative electrode material, and suppress self-discharge when the resulting graphite powder is used as the negative electrode material. It is also possible to improve the dispersibility of the graphite powder in a lithium secondary battery negative electrode material slurry.

When the green coke powder has a cumulative particle size at 50% in the volumetric cumulative particle size distribution of 50 pun or less, it is possible to maintain the capacity ratio when the resulting lithium secondary battery is charged and discharged at a high current.

The green coke powder used in connection with the production method according to one embodiment of the invention preferably has a ratio "cumulative particle size (D90) at 90% in volumetric cumulative particle size distribution/cumulative particle size (D10) at 10% in volumetric cumulative particle size distribution" of 2 to 16, more preferably 2 to 12, still more preferably 2 to 8, still more preferably 2 to 6, and yet more preferably 2 to 4.

Note that the cumulative particle size (D10), the cumulative particle size (D50), and the cumulative particle size (D90) of the green coke powder respectively refer to the cumulative particle size (μm) at 10%, the cumulative particle size (μm) at 50%, and the cumulative particle size (μm) at 90% in the volumetric cumulative particle size distribution measured using a laser diffraction particle size distribution analyzer ("SALD2000" manufactured by Shimadzu Corporation).

The green coke powder used in connection with the production method according to one embodiment of the invention preferably has a sphericity of 1.0 to 2.0, more preferably 1.0 to 1.7, and still more preferably 1.0 to 1.4.

Note that the sphericity of the green coke powder refers to a value determined by observing thirty particles of the green coke powder using a scanning electron microscope ("JSM-6510LV" manufactured by JEOL Ltd.), measuring the maximum diameter (ML) and the maximum width (BD) (i.e., the maximum dimension in the direction perpendicular to the diametrical direction) of each particle by image analysis, calculating the ratio "ML/BD", and calculating the average value thereof. When the measurement target particle has a perfectly spherical shape, the sphericity of the measurement target particle is 1.

The green coke powder may be prepared by optionally grinding the green coke.

The green coke may be ground using a known grinder. Examples of the grinder include a roll crusher, a hammer mill, a pin mill, a jet mill, a bevel impactor, a turbo mill, and the like. A green coke powder having the desired particle size may be prepared by combining a plurality of grinders among these grinders.

The grinding conditions using the grinder may be appropriately adjusted so that a green coke powder having the desired particle size can be obtained.

The production method according to one embodiment of the invention utilizes the coke powder that is obtained by heating the green coke powder at 600 to 1450° C. in a non-oxidizing atmosphere.

Examples of the non-oxidizing atmosphere include a nitrogen atmosphere, a rare gas atmosphere (e.g., argon atmosphere), and the like.

The coke powder used in connection with the production method according to one embodiment of the invention is obtained by heating the green coke powder at 600 to 1450° C., preferably 800 to 1450° C., more preferably 1000 to 1450° C., and still more preferably 1000 to 1200° C.

When the green coke powder is heated at 600° C. or more, it is possible to obtain a coke powder that has a reduced residual volatile content and high true density, and produces a dense compact, obtain a compact having high bulk density (described later), and improve the graphitization efficiency.

When the green coke powder is heated at 1450° C. or less, it is possible to obtain a coke powder having a high true density while achieving a high energy efficiency without increasing the heat treatment cost.

The coke powder used in connection with the production method according to one embodiment of the invention is preferably obtained by heating the green coke powder for 60 to 600 minutes, more preferably 60 to 450 minutes, and still more preferably 60 to 300 minutes.

The production method according to one embodiment of the invention includes melt-mixing the coke powder obtained by heating the green coke powder with the carbon precursor binder.

The term "carbon precursor binder" used herein refers to a material that can bind the coke powder when melted by heating, and can be carbonized by heating at a high temperature.

The carbon precursor binder may be one or more materials selected from coal tar pitch, petroleum pitch, ethylene heavy-end (EHE), anthracene oil, creosote oil, and FCC decant oil (FCCDO). A mixture of ethylene heavy-end or coal tar pitch and anthracene oil, a mixture of petroleum pitch and FCC decant oil, or the like may preferably be used as the carbon precursor binder.

The viscosity of the carbon precursor binder used in connection with the production method according to one embodiment of the invention is preferably 1 to 800 mPa·s, more preferably 1 to 600 mPa·s, and still more preferably 1 to 400 mPa·s.

When the viscosity of the carbon precursor binder is 800 mPa·s or less, it is possible to easily coat the coke powder uniformly with the binder, and improve the handling capability of the compact even when the amount of the carbon precursor binder is small. Since the amount of the carbon precursor binder can be reduced, it is possible to suppress an increase in specific surface area during grinding after graphitization.

If the viscosity of the carbon precursor binder exceeds 800 mPa·s, it may be difficult to coat the coke powder uniformly with the binder, and it may be necessary to use the carbon precursor binder so that the amount of fixed carbon included in the carbon precursor binder is 15 parts by mass or more based on 100 parts by mass of the coke powder. As a result, the strength of the graphitized compact may increase, and a large amount of energy may be required to grind the graphitized compact, whereby an increase in specific surface area may occur.

The viscosity of the carbon precursor hinder may be adjusted by mixing creosote oil, FCC decant oil (FCCDO), or the like that has a low fixed carbon content and low viscosity, with coal tar pitch or petroleum pitch that has a high fixed carbon content and high viscosity, in the desired ratio.

Note that the viscosity of the carbon precursor binder refers to a value measured in accordance with JIS K 7117 using a Brookfield viscometer ("B8L viscometer" manufactured by Tokyo Precision Instrument Co., Ltd.).

The production method according to one embodiment of the invention includes melt-mixing the coke powder and the carbon precursor binder so that the amount of fixed carbon included in the carbon precursor binder is 5 to 15 parts by mass, preferably 5 to 12.5 parts by mass, and more preferably 5 to 10 parts by mass, based on 100 parts by mass of the coke powder.

The term "amount of fixed carbon" used herein refers to a value obtained by subtracting the total amount of water, a volatile component, and ash from the amount of the carbon precursor binder. The term "amount of fixed carbon" used herein refers to a value that is measured and calculated in accordance with JIS K 2425.

Specifically, when 100 g of the carbon precursor binder is heated at 800° C. to remove water and a volatile component, and ash is removed from the residue to obtain x g of a residue (fixed carbon), the absolute amount (g) of fixed carbon is calculated by the following expression.

Amount(absolute amount)(g) of fixed carbon=amount(g) of carbon precursor binder×($x$(g)/100(g))

The amount (absolute amount) (g) of fixed carbon is converted into a relative amount based on 100 parts by mass of the coke powder to calculate the amount (parts by mass) of fixed carbon.

When the coke powder and the carbon precursor binder are mixed so that the amount of fixed carbon included in the carbon precursor binder is 15 parts by mass or less based on 100 parts by mass of the coke powder, the graphitized compact can be ground without requiring a large amount of energy, and a graphite powder for use as a lithium secondary battery negative electrode material that has a small specific surface area can be easily obtained. When the coke powder and the carbon precursor binder are mixed so that the amount of fixed carbon included in the carbon precursor binder is 5 parts by mass or more based on 100 parts by mass of the coke powder, a compact with a high handling capability can be obtained by pressing (described later), and the graphitization efficiency can be easily improved.

The coke powder and the carbon precursor binder may be melt-mixed using a known mixer that can heat the mixing target.

It is preferable to melt-mix the coke powder and the carbon precursor binder using a mixer that includes a stirring shaft, and mixes the mixing target using a stirring blade secured on the stirring shaft. Specific examples of such a mixer include a Henschel mixer (manufactured by Nippon Coke & Engineering. Co., Ltd.), a high-speed mixer (manufactured by Fukae Powtec Corporation), a Loedige mixer (manufactured by Matsubo Corporation), and the like. The coke powder and the carbon precursor binder may also be melt-mixed using a kneader or a universal mixer.

The coke powder and the carbon precursor binder are melt-mixed at a temperature equal to or less than the melting point of the carbon precursor binder and less than the carbonization temperature of the carbon precursor binder, preferably 80 to 180° C., and more preferably 100 to 160° C.

The melt-mixing time is preferably 1 to 20 minutes, more preferably 1 to 15 minutes, and still more preferably 1 to 10 minutes.

The coke powder and the carbon precursor binder may be melt-mixed by charging a mixer sequentially with the coke powder and the carbon precursor binder, and stirring (mixing) the coke powder and the carbon precursor binder while melting the coke powder and the carbon precursor binder by heating.

A molten mixture obtained by melt-mixing the coke powder and the carbon precursor binder is appropriately cooled. The molten mixture may be cooled by natural cooling, or may be cooled by forced cooling (e.g., air drying).

The production method according to one embodiment of the invention includes pressing the molten mixture to prepare a compact.

The molten mixture may be pressed using a known method. For example, the molten mixture may be pressed using a molding method, a cold isostatic pressing method, an isotropic pressing method, or the like. It is preferable to press the molten mixture using a cold isostatic pressing method.

It is preferable to press the molten mixture at a pressure of 1 to 1000 kgf/cm$^2$, more preferably 50 to 1000 kgf/cm$^2$, and still more preferably 100 to 1000 kgf/cm$^2$.

The pressing time is preferably 10 to 180 minutes, more preferably 20 to 150 minutes, and still more preferably 30 to 120 minutes.

When the pressing pressure and the pressure time are within the above ranges, it is possible to effectively reduce energy loss during grinding (described later), and obtain a graphite powder having a small surface area.

When implementing the production method according to one embodiment of the invention, the apparent density (bulk density) of the compact obtained by pressing is preferably 1.0 to 1.8 g/cm$^3$, more preferably 1.1 to 1.7 g/cm$^3$, and still more preferably 1.2 to 1.6 g/cm$^3$.

When the bulk density of the compact is within the above range, it is possible to efficiently implement the graphitization treatment (described later), and easily produce the graphite powder for use as a lithium secondary battery negative electrode material.

Note that the bulk density of the compact is determined by measuring the volume and the mass of the compact, and calculating the bulk density of the compact from the measured values.

Since the production method according to one embodiment of the invention implements graphitization and carbonization (described later) after pressing the molten mixture into a compact instead of directly graphitizing the molten mixture, it is possible to easily introduce and remove the material into and from a furnace (i.e., reduce work burden) during graphitization and carbonization, and easily produce the desired graphite powder.

The production method according to one embodiment of the invention includes heating the compact obtained by pressing in a non-oxidizing atmosphere to effect carbonization and graphitization to obtain a graphitized compact.

Examples of the non-oxidizing atmosphere used when carbonizing or graphitizing the compact include a nitrogen atmosphere, a rare gas atmosphere (e.g., argon atmosphere), an atmosphere that includes gas generated from the compact, and the like.

When implementing the production method according to one embodiment of the invention, the compact may be carbonized using a known heater.

For example, the compact may be carbonized by placing the compact in a heat-resistant saggar made of a metal, a graphite material, or the like, and adjusting the atmosphere, or embedding the compact in carbon powder packing, and heating the compact.

The compact may be carbonized by heating the compact using a known calcining furnace such as a tunnel furnace, an electric (electrical heater) furnace, an induction furnace, an electromagnetic furnace, or an electric-electromagnetic hybrid furnace, for example.

When implementing the production method according to one embodiment of the invention, the compact may be graphitized using a known heater.

For example, the compact may be graphitized by placing the compact in a heat-resistant saggar made of a metal, a graphite material, or the like, and adjusting the atmosphere, or embedding the compact in carbon powder packing, and heating the compact.

The compact may be graphitized by heating the compact using a known graphitization furnace such as a length-width graphitization furnace (LWG furnace) that is used when producing an artificial graphite electrode, or an Acheson furnace, or placing the compact in a graphite crucible, and heating the compact using an induction furnace that utilizes a graphite crucible as a heater, for example.

The compact may be carbonized and graphitized by heating the compact in a plurality of steps using a single heater or a plurality of heaters while changing the treatment temperature during carbonization and graphitization.

The compact may be carbonized and graphitized by heating the compact at a high temperature that corresponds to the graphitization temperature in a single step using a single heater.

When carbonizing and graphitizing the compact by heating the compact in a plurality of steps using a single heater or a plurality of heaters while changing the treatment temperature during carbonization and graphitization, the heating temperature when carbonizing the compact is preferably 600 to 1200° C., more preferably 600 to 1100° C., still more preferably 700 to 1100° C., still more preferably 700 to 1000° C., and yet more preferably 800 to 1000° C.

In this case, the heating time when carbonizing the compact is preferably 60 to 600 minutes, more preferably 60 to 450 minutes, and still more preferably 60 to 300 minutes.

When carbonizing and graphitizing the compact by heating the compact in a plurality of steps using a single heater or a plurality of heaters while changing the treatment temperature during carbonization and graphitization, the heating temperature when graphitizing the compact is preferably 2000 to 3000° C., more preferably 2600 to 3000° C., and still more preferably 2800 to 3000° C. In this case, the heating time when graphitizing the compact is preferably 60 to 600 minutes, more preferably 60 to 450 minutes, and still more preferably 60 to 300 minutes.

When carbonizing and graphitizing the compact by heating the compact at a high temperature that corresponds to the graphitization temperature in a single step using a single heater, the heating temperature when carbonizing and graphitizing the compact is preferably 2000 to 3000° C., more preferably 2600 to 3000° C., an d still more preferably 2800 to 3000° C. In this case, the heating time when carbonizing and graphitizing the compact is preferably 60 to 600 minutes, more preferably 60 to 450 minutes, and still more preferably 60 to 300 minutes.

The production method according to one embodiment of the invention includes grinding the graphitized compact obtained by heating.

The graphitized compact may be ground using a known grinder. Examples of the grinder include a hammer mill, a pin mill, a jet mill, a bevel impactor, a turbo mill, a knife hammer mill, a rotary cutter mill, a roll crusher, and the like.

When implementing the production method according to one embodiment of the invention, the graphitized compact may be ground using a plurality of grinders among these grinders.

The grinding conditions using the grinder may be appropriately adjusted so that a graphite powder having the desired properties and the like can be obtained.

The production method according to one embodiment of the invention can produce a graphite powder for use as a lithium secondary battery negative electrode material that has the desired properties by grinding the graphitized compact, or grinding the graphitized compact, and optionally classifying the ground product.

Examples of a classifier used when classifying the ground product include a rotor classifier, a vibrating sieve, an air current classifier, and the like.

It is preferable that the graphite powder for use as a lithium secondary battery negative electrode material that is obtained using the production method according to one embodiment of the invention have a sphericity of 1.0 to 2.0, more preferably 1.0 to 1.7, still more preferably 1.0 to 1.5, still more preferably 1.0 to 1.4, and yet more preferably 1.0 to 1.3.

When the sphericity of the graphite powder for use as a lithium secondary battery negative electrode material is within the above range, the graphite powder is easily oriented when producing a lithium secondary battery negative electrode (material) by pressing, and the battery capacity per unit volume can be improved.

If the sphericity of the graphite powder exceeds 2.0, a lithium secondary battery negative electrode (material) tends to expand during charge when the graphite powder is used as a lithium secondary battery negative electrode material, and the electrode performance tends to deteriorate.

Note that the sphericity of the graphite powder for use as a lithium secondary battery negative electrode material refers to a value determined by observing thirty particles of the graphite powder using a scanning electron microscope ("JSM-6510LV" manufactured by JEOL Ltd.), measuring the maximum diameter (ML) and the maximum width (BD) (i.e., the maximum dimension in the direction perpendicular to the diametrical direction) of each particle by image analysis, calculating the ratio "ML/BD", and calculating the average value thereof. When the measurement target particle has a perfectly spherical shape, the sphericity of the measurement target particle is 1.

It is preferable that the graphite powder for use as a lithium secondary battery negative electrode material that is obtained using the production method according to one embodiment of the invention have a cumulative particle size (volumetric median diameter D50) at 50% in the volumetric cumulative particle size distribution of 5 to 50 μm, more preferably 5 to 40 μm, still more preferably 5 to 30 μm, still more preferably 5 to 20 μm, still more preferably 5 to 17.5 μm, and yet more preferably 5 to 15 μm.

When the cumulative particle size D50 of the graphite powder is 5 μm or more, it is possible to suppress self-discharge, and advantageously disperse the graphite powder when preparing a slurry for producing a lithium secondary battery negative electrode (material).

When the cumulative particle size D50 of the graphite powder is 50 μm or less, it is possible to easily maintain the capacity ratio when the resulting lithium secondary battery is charged and discharged at a high current.

It is preferable that the graphite powder for use as a lithium secondary battery negative electrode material that is obtained using the production method according to one embodiment of the invention have a ratio "cumulative particle size (D90) at 90% in volumetric cumulative particle size distribution/cumulative particle size (D10) at 10% in volumetric cumulative particle size distribution" (ratio "D90/D10") of 2 to 16, more preferably 2 to 12, still more preferably 2 to 8, still more preferably 2 to 6, more preferably 2 to 5, and particularly preferably 2 to 4.

When the ratio "D90/D10" is within the above range, it is possible to suppress an increase in specific surface area due to a decrease in particle size, easily suppress an increase in irreversible capacity when the resulting graphite powder is used as a lithium secondary battery negative electrode material, and easily suppress a decrease in charge/discharge efficiency due to an increase in reactivity. It is possible to reduce the content of large particles having a particle size of 100 μm or more, and suppress a decrease in capacity ratio when the resulting lithium secondary battery is charged and discharged at a high current.

Note that the cumulative particle size (D10), the cumulative particle size (D50), and the cumulative particle size (D90) of the graphite powder for use as a lithium secondary battery negative electrode material respectively refer to the cumulative particle size (μm) at 10%, the cumulative particle size (μm) at 50%, and the cumulative particle size (μm) at 90% in the volumetric cumulative particle size distribution measured using a laser diffraction particle size distribution analyzer ("SALD2000" manufactured by Shimadzu Corporation).

It is preferable that the graphite powder for use as a lithium secondary battery negative electrode material that is obtained using the production method according to one embodiment of the invention have a specific surface area by nitrogen adsorption ($N_2SA$) of 1.0 to 4.0 $m^2/g$, more preferably 1.0 to 3.0 $m^2/g$, still more preferably 1.0 to 2.7 $m^2/g$, and particularly preferably 1.0 to 2.5 $m^2/g$.

When the specific surface area by nitrogen adsorption of the graphite powder for use as a lithium secondary battery negative electrode material that is obtained using the production method according to one embodiment of the invention is within the above range, it is possible to suppress an increase in irreversible capacity, and advantageously control reactivity when producing a lithium secondary battery negative electrode (material) using the graphite powder.

Note that the specific surface area by nitrogen adsorption ($N_2SA$) of the graphite powder for use as a lithium secondary battery negative electrode material refers to a value determined by subjecting the graphite powder to preliminary drying at 350° C. for 30 minutes while circulating nitrogen gas, and measuring the specific surface area by nitrogen adsorption, by a nitrogen adsorption BET 10-point method (gas flow method) using a surface area meter (automatic surface area meter "Gemini V" manufactured by Shimadzu Corporation) with a nitrogen-helium mixed gas for which the relative pressure of nitrogen gas with respect to the atmospheric pressure is accurately adjusted to 0.3.

The embodiments of the invention thus provide a method that can easily produce a graphite powder for use as a lithium secondary battery negative electrode material that has a small specific surface area while reducing the energy consumption, and achieving a high graphitization efficiency.

The invention is further described below by way of examples. Note that the invention is not limited to the following examples.

Example 1

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.4, a volumetric median diameter D50 of 10.8 μm, and a ratio "D90/D10" of 4.0. The green coke powder was heated at 1000° C. for 4 hours in a nitrogen atmosphere (i.e., non-oxidizing atmosphere) (hereinafter the same) to obtain a coke powder.

A Henschel mixer (manufactured by Nippon Coke & Engineering. Co., Ltd.) was charged with the coke powder and ethylene heavy-end (EHE) (amount of fixed carbon: 30.0 g/100 g) in an amount of 20 parts by mass based on 100 parts by mass of the coke powder so that the amount of fixed carbon included in the ethylene heavy-end (EHE) was 6 parts by mass based on 100 parts by mass of the coke powder, and the mixture was melt-mixed (stirred) at 120° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.34 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.3, a volumetric median diameter D50 of 10.2 μm, a ratio "D90/D10" of 3.8, and a specific surface area by nitrogen adsorption (N$_2$SA) of 1.9 m$^2$/g.

The production conditions for the graphite powder for use as a lithium secondary battery negative electrode material are shown in Table 1.

Production of Lithium-Ion Secondary Battery

Production of Negative Electrode (Working Electrode)

5 L of a 1 mass % carboxymethyl cellulose (CMC) aqueous solution (thickener) was added to 10 g of the graphite powder for use as a lithium secondary battery negative electrode material, and the mixture was stirred (mixed) for 30 minutes. After the addition of 0.25 L of a 40 mass % styrene-butadiene rubber (SBR) aqueous solution (binder), the mixture was stirred (mixed) for 5 minutes to prepare a negative electrode material paste.

The resulting negative electrode material paste was applied to a copper foil (collector) having a thickness of 18 μm, and heated at 130° C. under vacuum to completely volatilize the aqueous medium to obtain an electrode sheet. The resulting electrode sheet was rolled using a roller press so that the electrode density was 1.5 g/cc, and punched using a punch to obtain a negative electrode (working electrode).

Production of Positive Electrode (Counter Electrode)

A lithium metal foil was forced into a nickel mesh (collector) (thickness: 270 μm, punched using a punch) in an inert atmosphere to obtain a positive electrode (counter electrode).

Production of Evaluation Lithium Secondary Battery a

A 1:1 mixed solution of ethylene carbonate (EC) and diethyl carbonate (DEC) in which LiPF$_6$ (lithium salt) was dissolved at a concentration of 1 mol/dm$^3$, was used as an electrolyte solution. As illustrated in FIG. 1, a positive electrode 4 (counter electrode) forced into a nickel mesh (collector) 3 (produced as described above), a separator 5, a negative electrode (working electrode) 8 (produced as described above), and a spacer 7 were stacked inside a case 1 in an inert atmosphere, and sealed using a lid (cap) 2 through a spring 6 to obtain a button-type evaluation lithium secondary battery a having the l configuration illustrated in FIG. 1.

The resulting evaluation lithium secondary battery a was charged at a constant current at a current density of 0.2 mA/cm$^2$ (cut-off voltage: 5 mV), and held at a constant potential until a lower-limit current of 0.02 mA/cm$^2$ was reached. The evaluation lithium secondary battery a was then discharged at a constant current at a current density of 0.2 mA/cm$^2$ (cut-off voltage: 1.5 V). The discharge capacity after completion of 5 cycles was calculated to be the rated capacity (reversible capacity (mAh/g)). The results are shown in Table 2.

The output characteristics of the negative electrode material were determined by calculating the capacity ratio (%) (i.e., initial efficiency (%)) when the evaluation lithium secondary battery a in a full charge state was discharged at a current density of 10 mA/cm$^2$, using the following expression. The results are shown in Table 2.

Initial efficiency (%)=(discharge capacity(mAh/g) in first cycle/charge capacity(mAh/g) in first cycle)×100

Production of Evaluation Lithium Secondary Battery b

An evaluation lithium secondary battery b was produced in the same manner as the evaluation lithium secondary battery a, except that the counter electrode was produced using lithium cobalt oxide.

The evaluation lithium secondary battery b was repeatedly charged and discharged at 60° C. in 100 cycles at a current density of 0.2 mA/cm$^2$ between 4.1 V and 3.0 V, and the ratio of the discharge capacity in the 100th cycle to the discharge capacity in the first cycle was evaluated as the cycle characteristic ratio (%). The results are shown in Table 2.

Cycle characteristic ratio (%)=(discharge capacity (mAh/g) in 100th cycle/discharge capacity (mAh/g) in first cycle)×100

Example 2

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 11.2 μm, and a ratio "D90/D10" of 4.3. The green coke powder was heated at 1300° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder and ethylene heavy-end (EHE) (amount of fixed carbon: 30.0 g/100 g) in an amount of 30 parts by mass based on 100 parts by mass of the coke powder so that the amount of fixed carbon included in the ethylene heavy-end (EHE) was 9 parts by mass based on 100 parts by mass of the coke powder, and the mixture was melt-mixed (stirred) at 120° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.48 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.4, a volumetric median diameter D50 of 11.0 μm, a ratio "D90/D10" of 4.2, and a specific surface area by nitrogen adsorption ($N_2SA$) of 1.9 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 3

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.2, a volumetric median diameter D50 of 10.6 μm, and a ratio "D90/D10" of 4.1. The green coke powder was heated at 850° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder and ethylene heavy-end (EHE) (amount of fixed carbon: 30.0 g/100 g) in an amount of 30 parts by mass based on 100 parts by mass of the coke powder so that the amount of fixed carbon included in the ethylene heavy-end (EHE) was 9 parts by mass based on 100 parts by mass of the coke powder, and the mixture was melt-mixed (stirred) at 120° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.47 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.2, a volumetric median diameter D50 of 10.8 μm, a ratio "D90/D10" of 3.7, and a specific surface area by nitrogen adsorption ($N_2SA$) of 1.9 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 4

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.4, a volumetric median diameter D50 of 10.3 μm, and a ratio "D90/D10" of 4.5. The green coke powder was heated at 650° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder and ethylene heavy-end (EHE) (amount of fixed carbon: 30.0 g/100 g) in an amount of 30 parts by mass based on 100 parts by mass of the coke powder so that the amount of fixed carbon included in the ethylene heavy-end (EHE) was 9 parts by mass based on 100 parts by mass of the coke powder, and the mixture was melt-mixed (stirred) at 120° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.37 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.3, a volumetric median diameter D50 of 10.5 μm, a ratio "D90/D10" of 4.0, and a specific surface area by nitrogen adsorption ($N_2SA$) of 1.8 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 5

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.4, a volumetric median diameter D50 of 10.8 μm, and a ratio "D90/D10" of 3.8. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, coal tar pitch (amount of fixed carbon: 60.0 g/100 g) in an amount of 12 parts by mass based on 100 parts by mass of the coke powder, and anthracene oil (amount of fixed carbon: 1.7 g/100 g) in an amount of 6 parts by mass based on 100 parts by mass of the coke powder so that the amount of fixed carbon included in the coal tar pitch was 7.2 parts by mass based on 100 parts by mass of the coke powder, and the amount of fixed carbon included in the anthracene oil was 0.1 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.32 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.4, a volumetric median diameter D50 of 10.6 μm, a ratio "D90/D10" of 3.6, and a specific surface area by nitrogen adsorption ($N_2SA$) of 1.6 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 6

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.2, a volumetric median diameter D50 of 10.3 μm, and a ratio "D90/D10" of 4.0. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, coal tar pitch (amount of fixed carbon: 60.0 g/100 g) in an amount of 20 parts by mass based on 100 parts by mass of the coke powder, and anthracene oil (amount of fixed carbon: 2.0 g/100 g) in an amount of 10 parts by mass based on 100 parts by mass of the coke powder so that the amount of fixed carbon included in the coal tar pitch was 12 parts by mass based on 100 parts by mass of the coke powder, and the amount of fixed carbon included in the anthracene oil was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.39 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.3, a volumetric median diameter D50 of 10.6 µm, a ratio "D90/D10" of 3.8, and a specific surface area by nitrogen adsorption ($N_2SA$) of 2.3 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 7

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.2, a volumetric median diameter D50 of 10.8 µm, and a ratio "D90/D10" of 3.8. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 12 parts by mass based on 100 parts by mass of the coke powder, and FCC decant oil (FCCDO) (amount of fixed carbon: 1.7 g/100 g) in an amount of 6 parts by mass based on 100 parts by mass of the coke powder so that the amount of fixed carbon included in the petroleum pitch was 7.2 parts by mass based on 100 parts by mass of the coke powder, and the amount of fixed carbon included in the FCCDO was 0.1 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.32 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.2, a volumetric median diameter D50 of 10.7 µm, a ratio "D90/D10" of 3.7, and a specific surface area by nitrogen adsorption ($N_2SA$) of 1.7 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 8

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 10.8 µm, and a ratio "D90/D10" of 3.7. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 20 parts by mass based on 100 parts by mass of the coke powder, and FCC decant oil (FCCDO) (amount of fixed carbon: 2.0 g/100 g) in an amount of 10 parts by mass based on 100 parts by mass of the coke powder so that the amount of fixed carbon included in the petroleum pitch was 12 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.40 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.3, a volumetric median diameter D50 of 10.2 µm, a ratio "D90/D10" of 3.9, and a specific surface area by nitrogen adsorption ($N_2SA$) of 2.4 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 9

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.5, a volumetric median diameter D50 of 25.6 µm, and a ratio "D90/D10" of 5.9. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.7 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.37 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.5, a volumetric median diameter D50 of 25.3 µm, a ratio "D90/D10" of 5.7, and a specific surface area by nitrogen adsorption ($N_2SA$) of 1.3 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 10

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.4, a volumetric median diameter D50 of 6.5 µm, and a ratio "D90/D10" of 3.6. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.7 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.35 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.4, a volumetric median diameter D50 of 5.7 µm, a ratio "D90/D10" of 3.8, and a specific surface area by nitrogen adsorption ($N_2SA$) of 3.1 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 11

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.6, a volumetric median diameter D50 of 32.3 μm, and a ratio "D90/D10" of 4.9. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.7 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm² to obtain a columnar compact (diameter: 500 mm, height: 1000 mm, bulk density: 1.35 g/cm³).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.6, a volumetric median diameter D50 of 30.6 μm, a ratio "D90/D10" of 4.8, and a specific surface area by nitrogen adsorption (N₂SA) of 1.1 m²/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 12

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.7, a volumetric median diameter D50 of 46.8 μm, and a ratio "D90/D10" of 4.9. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.7 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm² to obtain a columnar compact (diameter: 500 mm, height: 1000 mm, bulk density: 1.36 g/cm³).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.7, a volumetric median diameter D50 of 45.2 μm, a ratio "D90/D10" of 3.2, and a specific surface area by nitrogen adsorption (N₂SA) of 0.9 m²/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 13

Production of Graphite Powder for Use as Lithium Secondary Battery Negative Electrode Material Petroleum green coke was coarsely ground using a roll crusher, and finely ground using a turbo mill ("Turbo-mill"

manufactured by Freund-Turbo Corporation) to prepare a green coke powder having a sphericity of 1.5, a volumetric median diameter D50 of 20.8 μm, and a ratio "D90/D10" of 4.9. The green coke powder was heated at 1450° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.7 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.50 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.5, a volumetric median diameter D50 of 19.6 μm, a ratio "D90/D10" of 4.8, and a specific surface area by nitrogen adsorption (N$_2$SA) of 1.2 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Example 14

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 10.5 μm, and a ratio "D90/D10" of 4.9. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.7 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.34 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation) to obtain a graphite powder for use as a lithium secondary battery negative electrode material having a sphericity of 1.3, a volumetric median diameter D50 of 19.8 μm, a ratio "D90/D10" of 5.6, and a specific surface area by nitrogen adsorption (N$_2$SA) of 1.9 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Comparative Example 1

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 11.5 μm, and a ratio "D90/D10" of 4.2. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder and coal tar pitch (amount of fixed carbon: 60.0 g/100 g) in an amount of 5 parts by mass based on 100 parts by mass of the coke powder so that the amount of fixed carbon included in the coal tar pitch was 3 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm² in order to obtain a columnar compact (diameter: 500 mm, height: 1000 mm). However, such a columnar compact could not be obtained since sufficient strength could not be achieved.

Comparative Example 2

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 10.7 µm, and a ratio "D90/D10" of 3.8. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder and coal tar pitch (amount of fixed carbon: 60.0 g/100 g) in an amount of 35 parts by mass based on 100 parts by mass of the coke powder so that the amount of fixed carbon included in the coal tar pitch was 21 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm² to obtain a columnar compact (diameter: 500 mm, height: 1000 mm, bulk density: 1.53 g/cm³).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.4, a volumetric median diameter D50 of 10.5 µm, a ratio "D90/D10" of 4.5, and a specific surface area by nitrogen adsorption ($N_2SA$) of 5.3 m²/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated.

An evaluation lithium secondary battery b was produced in the same manner as in Example 1 using the resulting graphite powder for use as a lithium secondary battery negative electrode material, and the cycle characteristic ratio was calculated. The results are shown in Table 2.

Comparative Example 3

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 11.5 µm, and a ratio "D90/D10" of 4.3. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder and ethylene heavy-end (EHE) (amount of fixed carbon: 30.0 g/100 g) in an amount of 10 parts by mass based on 100 parts by mass of the coke powder so that the amount of fixed carbon included in the ethylene heavy-end (EHE) was 3 parts by mass based on 100 parts by mass of the coke powder, and the mixture was melt-mixed (stirred) at 120° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm² in order to obtain a columnar compact (diameter: 500 mm, height: 1000 mm). However, such a columnar compact could not be obtained since sufficient strength could not be achieved.

Comparative Example 4

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.4, a volumetric median diameter D50 of 11.3 µm, and a ratio "D90/D10" of 3.8. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon; 60.0 g/100 g) in an amount of 5 parts by mass based on 100 parts by mass of the coke powder, and FCC decant oil (FCCDO) (amount of fixed carbon: 0.0 g/100 g) in an amount of 2.5 parts by mass based on 100 parts by mass of the coke powder so that the amount of fixed carbon included in the petroleum pitch was 3 parts by mass based on 100 parts by mass of the coke powder, and the amount of fixed carbon included in the FCCDO was 0 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm² in order to obtain a columnar compact (diameter: 500 mm, height: 1000 mm). However,

Comparative Example 5

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.4, a volumetric median diameter D50 of 10.7 µm, and a ratio "D90/D10" of 4.5. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 30 parts by mass based on 100 parts by mass of the coke powder, and FCC decant oil (FCCDO) (amount of fixed carbon: 2.0 g/100 g) in an amount of 15 parts by mass based on 100 parts by mass of the coke powder so that the amount of fixed carbon included in the petroleum pitch was 18 parts by mass based on 100 parts by mass of the coke powder, and the amount of fixed carbon included in the FCCDO was 0.3 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.52 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.4, a volumetric median diameter D50 of 10.6 µm, a ratio "D90/D10" of 4.7, and a specific surface area by nitrogen adsorption ($N_2SA$) of 4.5 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Comparative Example 6

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 10.5 µm, and a ratio "D90/D10" of 4.3. The green coke powder was heated at 500° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.0 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.10 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.2, a volumetric median diameter D50 of 11.4 m, a ratio "D90/D10" of 4.3, and a specific surface area by nitrogen adsorption ($N_2SA$) of 1.7 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Comparative Example 7

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 10.6 µm, and a ratio "D90/D10" of 3.9. The green coke powder was heated at 1500° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.0 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm² to obtain a columnar compact (diameter: 500 mm, height: 1000 mm, bulk density: 1.38 g/cm³).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.3, a volumetric median diameter D50 of 10.8 µm, a ratio "D90/D10" of 4.2, and a specific surface area by nitrogen adsorption (N₂SA) of 1.8 m²/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Comparative Example 8

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.5, a volumetric median diameter D50 of 52.6 µm, and a ratio "D90/D10" of 7.4. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.7 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm² to obtain a columnar compact (diameter: 500 mm, height: 1000 mm, bulk density: 1.37 g/cm³).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.5, a volumetric median diameter D50 of 53.6 µm, a ratio "D90/D10" of 7.2, and a specific surface area by nitrogen adsorption (N₂SA) of 1.1 m²/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

Comparative Example 9

Production of Graphite Powder for Use as Lithium Secondary Battery Negative Electrode Material Petroleum green coke was coarsely ground using a roll crusher, and finely ground using a turbo mill ("Turbo-mill" manufactured by Freund-Turbo Corporation) to prepare a green coke powder having a sphericity of 1.3, a volumetric median diameter D50 of 3.5 µm, and a ratio "D90/D10" of 4.6. The green coke powder was heated at 1000° C. for 4 hours in a nitrogen atmosphere (i.e., non-oxidizing atmosphere) to obtain a coke powder.

A Henschel mixer (manufactured by Nippon Coke & Engineering. Co., Ltd.) was charged with the coke powder, petroleum pitch (amount of fixed carbon: 60.0 g/100 g) in an amount of 15 parts by mass based on 100 parts by mass of the coke powder, and FCC decant oil (FCCDO) (amount of fixed carbon: 2.7 g/100 g) in an amount of 7.5 parts by mass based on 100 parts by mass of the coke powder so that the amount of fixed carbon included in the petroleum pitch was 9 parts by mass based on 100 parts by mass of the coke powder, and the amount of fixed carbon included in the FCCDO was 0.2 parts by mass based on 100 parts by mass of the coke powder, and the mixture was melt-mixed (stirred) at 150° C. for 10 minutes at a moving vane rotational speed of 3000 rpm to obtain a molten powder mixture.

The resulting molten powder mixture was put in a rubber die, and subjected to cold isostatic pressing for 90 minutes at a pressure of 1000 kgf/cm$^2$ to obtain a columnar compact (diameter: 500 mm, height: 1000 mm, bulk density: 1.32 g/cm$^3$).

The resulting compact was put in a saggar made of stainless steel (SUS) together with carbon breeze packing, calcined at 1000° C. for 4 hours in an inert atmosphere using a Riedhammer type ring kiln, put in an Acheson type graphitization furnace, and graphitized at 3000° C. for 4 hours in an inert atmosphere to obtain a columnar graphitized compact.

The columnar graphitized compact was ground using a turbo mill ("Turbo-mill" manufactured by Freund-Turbo Corporation), and classified using a classifier ("Turbo Classifier" manufactured by Nisshin Flour Milling Inc.) to obtain a graphite powder for use as a lithium secondary battery negative electrode material having a sphericity of 1.3, a volumetric median diameter D50 of 3.3 μm, a ratio "D90/D10" of 4.5, and a specific surface area by nitrogen adsorption ($N_2SA$) of 4.8 m$^2$/g.

The production conditions for the graphite powder for use as a lithium secondary battery negative electrode material are shown in Table 1.

Production of Lithium-Ion Secondary Battery

An evaluation lithium secondary battery a was produced in the same manner as in Example 1 using the resulting graphite powder for use as a lithium secondary battery negative electrode material, and the rated capacity (reversible capacity) and the initial efficiency (%) were calculated. An evaluation lithium secondary battery b was produced in the same manner as in Example 1 using the resulting graphite powder for use as a lithium secondary battery negative electrode material, and the cycle characteristic ratio was calculated. The results are shown in Table 2.

TABLE 1

| | Green coke powder | | | Carbon precursor binder | Compact | | Graphite powder for use as lithium secondary battery negative electrode material | | | |
|---|---|---|---|---|---|---|---|---|---|---|
| | D50 (μm) | Heating temperature (° C.) | Type | Amount (parts by mass) of fixed carbon based on 100 parts by mass of coke powder | External appearance | Bulk density (g/cm$^3$) | Sphericity | D50 (μm) | D90/D10 | $N_2SA$ (m$^2$/g) |
| Example 1 | 10.8 | 1000 | EHE | 6 | Good | 1.34 | 1.3 | 10.2 | 3.8 | 1.9 |
| Example 2 | 11.2 | 1300 | EHE | 9 | Good | 1.48 | 1.4 | 11.0 | 4.2 | 1.9 |
| Example 3 | 10.6 | 850 | EHE | 9 | Good | 1.47 | 1.2 | 10.8 | 3.7 | 1.9 |
| Example 4 | 10.3 | 6500 | EHE | 9 | Good | 1.37 | 1.3 | 10.5 | 4.0 | 1.8 |
| Example 5 | 10.8 | 1000 | Coal tar pitch + anthracene oil | 7.3 | Good | 1.32 | 1.4 | 10.6 | 3.6 | 1.6 |
| Example 6 | 10.3 | 1000 | ↑ | 12.2 | Good | 1.39 | 1.3 | 10.6 | 3.8 | 2.5 |
| Example 7 | 10.8 | 1000 | Petroleum pitch + FCCDO | 7.3 | Good | 1.32 | 1.2 | 10.7 | 3.7 | 1.7 |
| Example 8 | 10.8 | 1000 | ↑ | 12.2 | Good | 1.40 | 1.3 | 10.2 | 3.9 | 2.4 |
| Example 9 | 25.6 | 1000 | ↑ | 9.2 | Good | 1.37 | 1.5 | 25.3 | 5.7 | 1.3 |
| Example 10 | 6.5 | 1000 | ↑ | 9.2 | Good | 1.35 | 1.4 | 5.7 | 3.8 | 3.1 |
| Example 11 | 32.3 | 1000 | ↑ | 9.2 | Good | 1.35 | 1.6 | 30.6 | 4.8 | 1.1 |
| Example 12 | 46.8 | 1000 | ↑ | 9.2 | Good | 1.36 | 1.7 | 45.2 | 3.2 | 0.9 |
| Example 13 | 20.8 | 1450 | ↑ | 9.2 | Good | 1.50 | 1.5 | 19.6 | 4.8 | 1.2 |
| Example 14 | 10.5 | 1000 | ↑ | 9.2 | Good | 1.34 | 1.3 | 19.8 | 5.6 | 1.9 |
| Comparative Example 1 | 11.5 | 1000 | Coal tar pitch | 3 | Could not be obtained | — | — | — | — | — |
| Comparative Example 2 | 10.7 | 1000 | ↑ | 21 | Good | 1.53 | 1.4 | 10.5 | 4.5 | 5.3 |
| Comparative Example 3 | 11.5 | 1000 | EHE | 3 | Could not be obtained | — | — | — | — | — |
| Comparative Example 4 | 11.3 | 1000 | Petroleum pitch + FCCDO | 3 | Could not be obtained | — | — | — | — | — |
| Comparative Example 5 | 10.7 | 1000 | ↑ | 18.3 | Good | 1.52 | 1.4 | 10.6 | 4.7 | 4.5 |
| Comparative Example 6 | 10.5 | 500 | ↑ | 9.2 | Good | 1.10 | 1.2 | 11.4 | 4.3 | 1.7 |
| Comparative Example 7 | 10.6 | 1500 | ↑ | 9.2 | Good | 1.38 | 1.3 | 10.8 | 4.2 | 1.8 |
| Comparative Example 8 | 52.6 | 1000 | ↑ | 9.2 | Good | 1.37 | 1.5 | 53.6 | 7.2 | 1.1 |
| Comparative Example 9 | 3.5 | 1000 | ↑ | 9.2 | Good | 1.32 | 1.3 | 3.3 | 4.5 | 4.8 |

TABLE 2

|  | Reversible capacity (mAh/g) | Initial efficiency (%) | Cycle characteristic ratio (%) |
|---|---|---|---|
| Example 1 | 343 | 94.5 | 92 |
| Example 2 | 337 | 94.6 | 91 |
| Example 3 | 345 | 94.5 | 92 |
| Example 4 | 335 | 94.6 | 92 |
| Example 5 | 343 | 95.0 | 91 |
| Example 6 | 339 | 93.8 | 91 |
| Example 7 | 340 | 94.3 | 92 |
| Example 8 | 342 | 93.2 | 90 |
| Example 9 | 338 | 95.6 | 86 |
| Example 10 | 337 | 91.2 | 93 |
| Example 11 | 336 | 95.2 | 82 |
| Example 12 | 335 | 95.2 | 80 |
| Example 13 | 335 | 95.3 | 88 |
| Example 14 | 337 | 94.5 | 92 |
| Comparative Example 1 | — | — | — |
| Comparative Example 2 | 332 | 82.3 | 92 |
| Comparative Example 3 | — | — | — |
| Comparative Example 4 | — | — | — |
| Comparative Example 5 | 334 | 77.8 | 91 |
| Comparative Example 6 | 341 | 93.1 | 92 |
| Comparative Example 7 | 340 | 93.6 | 91 |
| Comparative Example 8 | 336 | 95.8 | 63 |
| Comparative Example 9 | 336 | 78.6 | 93 |

As shown in Tables 1 and 2, a graphite powder for use as a lithium secondary battery negative electrode material having a small specific surface area could be easily produced in Examples 1 to 14 while reducing the energy consumption, and achieving a high graphitization efficiency, by melt-mixing a coke powder and a carbon precursor binder so that the amount of fixed carbon included in the carbon precursor binder was 5 to 15 parts by mass based on 100 parts by mass of the coke powder, to prepare a mixture, and pressing the mixture to prepare a compact, the coke powder being obtained by heating a green coke powder at 600 to 1450° C. in a non-oxidizing atmosphere, the green coke powder having a cumulative particle size at 50% in the volumetric cumulative particle size distribution of 5 to 50 µm; heating the compact in a non-oxidizing atmosphere to effect carbonization and graphitization to obtain a graphitized compact; and grinding the graphitized compact. The lithium secondary battery produced using the resulting graphite powder as the negative electrode material exhibited excellent battery characteristics.

In Comparative Examples 1, 3, and 4, since the amount of fixed carbon included in the carbon precursor binder was small, the desired compact could not be obtained due to low strength, and the handling capability deteriorated during carbonization and graphitization, whereby the productivity of the graphite powder decreased (see Tables 1 and 2).

In Comparative Examples 2 and 5, since the amount of the carbon precursor binder was too large, the graphitized compact was unnecessarily hard, and a large amount of energy was required when grinding the graphitized compact. A number of minute irregularities were formed on the surface of the particles due to an impact applied when grinding the graphitized compact, and the resulting graphite powder had a large specific surface area (see Table 1).

As a result, the initial efficiency decreased when the lithium secondary battery was produced using the resulting graphite powder as the negative electrode material (see Table 2).

In Comparative Example 6, since the coke powder obtained by heating the green coke powder at a temperature as low as 500° C. was used, the bulk density of the compact obtained by pressing decreased, and the graphitization efficiency also decreased, whereby productivity was poor (see Table 1).

The battery characteristics achieved in Comparative Example 7 were almost similar to those achieved in Example 6. However, since the green coke powder heating temperature was high, the energy efficiency during production was lower than that of Example 6 (see Table 1).

In Comparative Example 8, since the volumetric median diameter D50 of the green coke powder was too large, the cycle characteristics deteriorated when the lithium secondary battery was produced using the resulting graphite powder as the negative electrode material (see Table 2).

In Comparative Example 9, since the volumetric median diameter D50 of the green coke powder was too small, the initial efficiency decreased when the lithium secondary battery was produced using the resulting graphite powder as the negative electrode material (see Table 2).

INDUSTRIAL APPLICABILITY

The embodiments of the invention thus provide a method that can easily produce a graphite powder for use as a lithium secondary battery negative electrode material that has a small specific surface area while reducing the energy consumption, and achieving a high graphitization efficiency.

REFERENCE SIGNS LIST

1 Case
2 Lid (cap)
3 Collector
4 Positive electrode
5 Separator
6 Spring
7 Spacer
8 Negative electrode
9 Gasket

The invention claimed is:

1. A method for producing a graphite powder for use as a lithium secondary battery negative electrode material, the method comprising:
   melt-mixing a coke powder and a carbon precursor binder so that an amount of fixed carbon included in the carbon precursor binder is 5 to 10 parts by mass based on 100 parts by mass of the coke powder, to prepare a mixture, the coke powder being obtained by heating a green coke powder at 600 to 1450° C. in a non-oxidizing atmosphere, the green coke powder having a cumulative particle size at 50% in a volumetric cumulative particle size distribution of 5 to 50 µm;
   pressing the mixture by cold isostatic pressing at a pressure of 100-1000 kgf/cm$^2$ to prepare a compact;
   heating the compact in a non-oxidizing atmosphere to effect carbonization and graphitization to obtain a graphitized compact; and
   grinding the graphitized compact,
   wherein a bulk density of the compact obtained by pressing is 1.2 to 1.8 g/cm$^3$, and
   wherein the carbon precursor binder comprises:
   (1) ethylene heavy-end alone, or
   (2) at least one selected from (A) coal tar pitch and petroleum pitch, and (B) at least one selected from the group consisting of anthracene oil, creosote oil, and FCC decant oil.

2. The method for producing a graphite powder for use as a lithium secondary battery negative electrode material according to claim 1, wherein bulk density of the compact, obtained by pressing is 1.2 to 1.6 g/cm$^3$, and wherein the pressing of the mixture is performed for 10-180 minutes.

3. The method for producing a graphite powder for use as a lithium secondary battery negative electrode material according to claim 2, the method producing a graphite powder for use as a lithium secondary battery negative electrode material that has a sphericity of 1.0 to 2.0, a cumulative particle size at 50% in a volumetric cumulative particle size distribution of 5 to 50 μm, a ratio "cumulative particle size at 90% in volumetric cumulative particle size distribution/cumulative particle size at 10% in volumetric cumulative particle size distribution" of 2 to 16, and a specific surface area by nitrogen adsorption of 1.0 to 4.0 m$^2$/g.

4. The method for producing a graphite powder for use as a lithium secondary battery negative electrode material according to claim 1, the method producing a graphite powder for use as a lithium secondary battery negative electrode material that has a sphericity of 1.0 to 2.0, a cumulative particle size at 50% in a volumetric cumulative particle size distribution of 5 to 50 μm, a ratio "cumulative particle size at 90% in volumetric cumulative particle size distribution/cumulative particle size at 10% in volumetric cumulative particle size distribution" of 2 to 16, and a specific surface area by nitrogen adsorption of 1.0 to 4.0 m$^2$/g.

\* \* \* \* \*